United States Patent [19]

Sambuis et al.

[11] Patent Number: 4,638,026

[45] Date of Patent: Jan. 20, 1987

[54] OZONE-STABILIZED RUBBERY ELASTOMERS

[75] Inventors: Bernard Sambuis, Montgeron; Daniel Gavory, Epinay sur Orge, both of France

[73] Assignee: Vulnax International Limited, Saint-Cloud, France

[21] Appl. No.: 662,517

[22] Filed: Oct. 19, 1984

[30] Foreign Application Priority Data

Oct. 19, 1983 [FR] France ................................ 83 16854

[51] Int. Cl.$^4$ .......................... C08K 5/34; C08K 5/13; C09K 15/16; C09K 15/22
[52] U.S. Cl. ...................................... 524/98; 524/104; 524/99; 524/326; 252/401; 252/403; 252/404
[58] Field of Search ....................... 252/401, 403, 404; 524/98, 100, 104, 326, 99

[56] References Cited

U.S. PATENT DOCUMENTS 2,550,363 10/1946 Luten, Jr. et al. ................... 524/98
2,581,907 1/1952 Smith, Jr. et al. ................. 524/326

OTHER PUBLICATIONS

Chemical Abstracts, vol. 98, No. 14, 1983, p. 65, No. 108679r.

*Primary Examiner*—John Kight
*Assistant Examiner*—Kriellion Morgan
*Attorney, Agent, or Firm*—Burns, Doane, Swecker & Mathis

[57] ABSTRACT

Rubbery elastomers are stabilized against the deleterious effects of ozone by having homogeneously incorporated therein, antiozonant effective amounts of an organic lactam compound.

15 Claims, No Drawings

OZONE-STABILIZED RUBBERY ELASTOMERS

BACKGROUND OF THE INVENTION

1. Field of the Invention

The present invention relates to the stabilization of the natural and synthetic rubbers against the deleterious effects of ozone, and to stabilized elastomeric compositions comprising such rubbers.

2. Description of the Prior Art

It is well known to this art that certain polymers, and more particularly the vulcanizates of incompletely saturated elastomers, are highly sensitive to the action of ozone. Among such elastomers can be mentioned the natural and synthetic rubbers, such as the homopolymers and copolymers of conjugated dienes, either with each other or with vinyl comonomers, and particularly polybutadiene, polyisoprene, isobutylene/isoprene copolymers, styrene/butadiene or acrylonitrile/butadiene copolymers, and polychloroprene.

When the rubbery elastomers are subjected to the action of a stress, the damaging effects of ozone are manifested in the appearance of surface cracks oriented at right angles to the direction of the stress. If this stress continues, or each time it occurs, the cracks deepen and can cause total rupture of the vulcanizates. The ozone sensitivity of the subject elastomers is of course a function of various parameters, such as the nature of the elastomer, the ozone concentration in the environment, the temperature and the time of exposure, and the magnitude of the stress to which the rubber is subjected. Atmospheric air contains a significant amount of ozone which can vary according to the geographical locations in question and most articles of vulcanized elastomers are typically subjected to stresses; this is the case, in particular, with automotive tires. The advantage of protecting these vulcanized elastomers to avoid their being damaged too rapidly is thus readily apparent.

Various processes for protecting rubbers against the deleterious effects of ozone have been proposed to this art. Thus, it has been proposed to incorporate into rubbers microcrystalline waxes whose exudation permitted a protective screen to be formed on the surface of the elastomers. This physical barrier is effective only insofar as it is unbroken by external forces, with the result that this mode of protection, excellent for the elastomers employed under static conditions, becomes inoperative when the vulcanized elastomers are subjected to a force under dynamic conditions. In such cases it is preferable to rely on the addition of chemical antiozonant compounds which retard the appearance of cracks under the static and/or dynamic conditions of use of the elastomers.

Very many chemical compounds have been proposed for use as antiozonant agents, but, nevertheless, the problem of protecting rubber vulcanizates has not been solved in a satisfactory manner, with the result that serious need exists in industry for effective antiozonants which do not concomitantly give rise to yet other difficulties. It has been found, in effect, that it is not enough that a chemical compound present a good degree of protection against ozone to constitute a satisfactory stabilizer, if its use is accompanied by disadvantages or drawbacks related to undesirable secondary effects, either at the stage of preparation of the vulcanizates or at the final product stage, or in respect of its handling and its incorporation in the masterbatches. Thus, it too is well known that many materials which offer excellent antiozonant activity are also noted for their tendency to color or stain the vulcanizates in which they are incorporated. Such antiozonants cannot, therefore, be employed for protecting light-colored or white elastomers, or even for protecting black elastomers which are in contact with items of a light color whatever their nature (metallic, rubbery or plastic-based). In the latter case, in fact, the antiozonants are apt to migrate from the elastomer onto the adjoining light-colored parts, on which they generate colorations and/or stains. It has further been determined that many antiozonants disturb the course of the vulcanization, either because they reduce its rate or, to the contrary, because they accelerate it to such a degree that they give rise to the well-known phenomenon of scorching.

SUMMARY OF THE INVENTION

Accordingly, a major object of the present invention is the provision of a novel class of antiozonants for the rubbery elastomers, which novel antiozonants otherwise avoid those disadvantages and drawbacks to date characterizing the state of this art.

Thus, in one respect the present invention provides a novel process for protecting the rubbery elastomers against attack by ozone by the use of novel antiozonant compounds. In a second respect the present invention provides the protected elastomers, per se, and in a third respect this invention provides a process designed for facilitating the incorporation of the antiozonants into the rubber. The present invention also provides a novel class of compositions based on antiozonants, facilitating the incorporation of the latter into rubbery elastomers.

Briefly, the present invention features protecting the natural and synthetic rubbers against the deleterious effects of ozone, by incorporating therein an antiozonant effective amount of a lactam of the general formula:

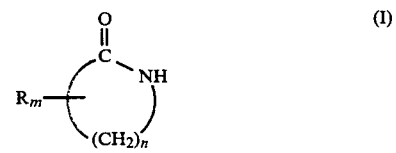

in which:

n is an integer ranging from 3 to 20;

m is 1 or 2; and

R is a lower alkyl radical or a phenyl radical.

By "lower alkyl radical" there is intended a linear or branched chain alkyl radical containing from 1 to 4 carbon atoms, such as the methyl, ethyl, n-propyl, isopropyl or isobutyl radicals.

DETAILED DESCRIPTION OF THE INVENTION

More particularly according to the present invention, exemplary of the subject lactams exhibiting antiozonant activity are γ-butyrolactam(pyrrolidone), δ-valerolactam(2-piperidone), γ-valerolactam, δ-caprolactam, ε-caprolactam, ζ-oenantholactam, caprylolactam, ω-nonanolactam, ω-decanolactam, ω-undecanolactam, ω-dodecanolactam(laurolactam), 4-methyl-2-piperidone, 5-phenyl-2-piperidone, 6-phenyl-2-piperidone, 5-ethylcaprolactam, 5-t-butylcaprolactam, 5-isopropylcaprolactam, 3-methylcaprolactam, 5-methylcaprolactam, 4-methyl-7-isopropylcaprolactam, 4-methyl-ζ- oenantholactam, 5-methyloenantholactam, 7-methyloenantholactam, 4-methyl-8-ethyloenantholactam, pentadecanolactam and octadecanolactam.

From among such lactams, preferred are those containing from 6 to 12 ring carbon atoms. ε-Caprolactam and its mono- or dialkyl substituted derivatives are even more preferred.

The use of lactams as antiozonants in rubber has been determined to be most particularly advantageous as a result of the high stabilizing power of these compounds against the deleterious effects of ozone on rubbers subjected to stresses, as well as their non-photosensitive nature which permits their use in white or light-colored rubbers or black rubbers destined to be placed in contact with white or light-colored objects.

The amount of lactam incorporated into the rubber varies as a function of the nature of the latter. It is known, in fact, that the sensitivity of rubbers to the deleterious effects of ozone depends, everything else being equal, on the nature of the rubber. This amount also depends upon other factors, such as the various conditions of use of the final rubber articles. It must therefore be determined for each particular case to limit, or prevent, a damaging action of ozone. In general, the amount of lactam varies from 0.1 to 5% by weight of the rubber. It would be possible, of course, to use amounts of lactams of over 5% by weight of the elastomer.

The utilization of mixtures of two or more lactams is also within the scope of the present invention.

The antiozonants according to the invention can be employed alone or in combination with other stabilizers such as antioxidants, heat stabilizers, light stabilizers, and the like.

Although the method of introducing the lactams into the rubbers is not critical, it is preferable to incorporate them in the latter before vulcanization. In such cases, the antiozonant can be added at the same time as the adjuvants, or separately. The addition and the homogeneous distribution of the lactam or lactams can be carried out using such conventional techniques of grinding and/or mastication.

A particularly advantageous method of introducing the lactams into the rubbers consists of dissolving same in a liquid compound miscible with the rubbers. For this purpose, use is preferably made of a conventional liquid adjuvant for the rubbers and, more particularly, of a liquid antioxidant. In this connection, the liquid phenolic antioxidants for rubbers which dissolve lactams are most highly suitable for producing solutions of lactams facilitating the addition of the latter into the rubbers by the conventional processes of mixing prior to vulcanization.

The present invention therefore has, as an additional object, a process for protecting natural and synthetic rubbers against the deleterious effects of ozone by incorporating therein a lactam such as those specified above in solution in a liquid carrier miscible with the rubber, and preferably in a liquid phenolic antioxidant.

The present invention also features liquid stabilizing compositions comprising a solution of a lactam as defined above in a liquid phenolic antioxidant.

The introduction of the lactams into the rubbers in the form of solutions lends itself particularly well to their use, as antiozonant, of ε-caprolactam whose hygroscopicity creates problems in storage and handling, thus making any industrial use of such compound quite difficult.

As liquid carrier for the lactam, representative are the polyalkylphenols or their mixtures, or phenols containing one or more phenylethyl groups (styrenated phenols): see J. R. Dunn, *Rubber Chemistry and Technology*, 47, page 960 et seq. (1974), and H. J. Stern, *Rubber, Natural and Synthetic* (McLaren Editions).

A class of phenolic antioxidants which satisfies this requirement particularly well consists of the liquid phenols having the general formula:

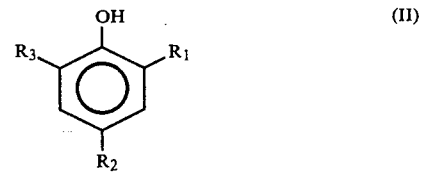

in which:
$R_1$ is a mono- or polycyclic cycloalkyl radical optionally substituted with one or more methyl radicals;
$R_2$ and $R_3$ represent lower alkyl radicals and preferably methyl groups.

More specifically, in the formula (II) $R_1$ is advantageously a cyclopentyl radical, cyclohexyl radical, 2-methylcyclohexyl radical, 3-methylcyclohexyl radical or a 2,4-dimethylcyclohexyl radical.

2-(2-Methylcyclohexyl)-4,6-dimethylphenol is an especially preferred solvent for ε-caprolactam.

The concentration of the lactam in the liquid antioxidant can vary over wide limits and naturally depends on the respective amounts of each of the components required to ensure satisfactory protection of the rubber, amounts which themselves vary depending upon the nature of the rubber. In practice, it is found particularly preferred to provide solutions containing at least 50% by weight of lactam.

The process for protecting the rubbers according to the present invention applies to all ozone-sensitive rubbery elastomers. Exemplary of such natural rubbers and synthetic rubbers, representative are the polymers of conjugated dienes (polybutadiene, polyisoprene, polychloroprene) and their copolymers either with each other (styrene/butadiene copolymers), or with monoethylenic monomers (styrene, acrylonitrile, methacrylonitrile).

In order to further illustrate the present invention and the advantages thereof, the following specific examples are given, it being understood that same are intended only as illustrative and in nowise limitative.

In said examples to follow, the antiozonant action of the lactams according to the invention is compared to that of an antiozonant which is known and widely employed in industry, i.e., N-phenyl-N'-isopropyl-p-phenylenediamine.

EXAMPLES 1 TO 5

The antiozonant activity of various lactams was tested in conjunction with a natural rubber marketed under the trademark SMR 5, using the following masterbatch:

| Material | Parts by weight |
| --- | --- |
| (1) Natural rubber | 100 |
| (2) Zinc oxide | 5 |
| (3) Stearic acid | 2 |
| (4) Carbon black N 330 | 50 |

-continued

| Material | Parts by weight |
| --- | --- |
| (5) Pine Tar | 3 |
| (6) Sulfur | 1.5 |
| (7) 2-N—Cyclohexylbenzothiazolylsulfenamide (CBS) | 0.5 |
| (8) Lactam | 2 |

The mixture was prepared in the following manner:
Into a Banbury type B mixer were added the following materials:
(i) at time zero: the natural rubber;
(ii) after 2 minutes: half of the carbon black;
(iii) after 3 minutes: the remainder of the carbon black, the zinc oxide, and the pine tar;
(iv) after 4½ minutes: the stearic acid.

The mixture was discharged after 6.5 minutes and was permitted to cool.

A strip was formed from the above mixture on a rubber roll mill (rolls 150×300 mm).

The vulcanizing system (sulfur and CBS) and the lactam were then added.

The material was maintained in the mill until a homogeneous mixture was obtained.

The mixtures were then vulcanized in a press at 153° C. to the vulcanization optimum (determined with the assistance of an oscillating rotor elastomer) as sheets 2 mm thick.

The mixtures were then exposed to ozone under the following conditions:
(a) controlled ozone concentration 50 p.p.h.m. (parts per $10^8$ parts of air),
(b) temperature: 40° C.
(c) exposure of the specimens:
(i) static: subjected to an elongation of 10%;
(ii) dynamic: subjected to elongations increasing from 0 to 25% extension at a rate of 30 cycles/minute.

The state of the specimens was monitored visually at regular intervals and the time required to obtain cracking with average dimensions visible to the naked eye was noted.

The same test was reproduced, for comparison, firstly without antiozonant and then with the lactam replaced by N-phenyl-N'-isopropyl-p-phenylenediamine, a known and widely used antiozonant.

The results obtained are reported in the Table I which follows:

EXAMPLE 6

This example illustrates the antiozonant action of ε-caprolactam in a synthetic polyisoprene marketed under the trademark NATSYN 2200.

The formulation of the mixture was as follows:

| Material | Parts by weight |
| --- | --- |
| (1) Synthetic polyisoprene | 100 (Natsyn 2200) |
| (2) Carbon black N 330 | 50 |
| (3) Aromatic plasticizer (trademark Dutrex 729 FC) | 5 |
| (4) Zinc oxide | 5 |
| (5) Stearic acid | 3 |
| (6) Sulfur | 2 |
| (7) 2-N—Cyclohexylbenzothiazolylsulfenamide (CBS) | 1 |
| (8) Caprolactam | 2 |

The mixture was prepared in a Banbury type B internal mixer. Only the vulcanizing system and the protective agent were added subsequently on roll mills. The process was the same as in Examples 1 to 5.

The mixtures were then vulcanized under pressure to the optimum at 153° C. in sheets 2 mm thick.

The mixtures were exposed to ozone under the same conditions as in Examples 1 to 5.

The times taken to obtain an "average" state of cracking were noted. The results are reported in the following Table II:

TABLE II

| EXAMPLES/TESTS | Product used | Time (in hours) to obtain an "average" state of cracking | |
| --- | --- | --- | --- |
| | | Static exposure | Dynamic exposure |
| 6 | ε-caprolactam | 69 | 86 |
| C | NONE | 2.75 | 3.7 |

EXAMPLE 7

In this example the antiozonant action of ε-caprolactam was tested in a polybutadiene marketed under the trademark BR 1220. The product was tested in the mixture consisting of the following ingredients:

| Material | Parts by weight |
| --- | --- |
| (1) Polybutadiene | 100 |
| (2) Carbon black N 330 | 50 |
| (3) Aromatic plasticizer (Dutrex 729 FC) | 8 |
| (4) Zinc oxide | 5 |
| (5) Stearic acid | 2 |

TABLE I

| EXAMPLES/TESTS | Product used | Optimum time for vulcanization at 153° C. (in min) | Time (in hours) to obtain an "average" state of cracking | |
| --- | --- | --- | --- | --- |
| | | | Static exposure | Dynamic exposure |
| 1 | 2-pyrrolidinone | 8 | 65 | 70 |
| 2 | ε-caprolactam | 7 | 86 | 170 |
| 3 | ζ-oenantholactam (2-azacyclooctanone) | 7.5 | 120 | 160 |
| 4 | caprylolactam (2-azacyclononanone) | 8 | 120 | 160 |
| 5 | laurolactam (2-azacyclotridecanone) | 10 | 80 | 110 |
| A | NONE | 12 | 24 | 35 |
| B | N—phenyl-N'—isopropyl-p-phenylenediamine | 11 | 48 | 135 |

-continued

| Material | Parts by weight |
| --- | --- |
| (6) Sulfur | 2 |
| (7) 2-N—Cyclohexylbenzothiazolylsulfenamide (CBS) | 1 |
| (8) ε-Caprolactam | 2 |

The mixture, except for the sulfur, the vulcanization accelerator and the protective system, was prepared in a Banbury type B internal mixer.

The missing ingredients were then incorporated on roll mills, as in Example 1.

The mixtures were then vulcanized in a press in molds at 153° into sheets 2 mm thick, to the vulcanization optimum.

Specimens 2 mm thick were then exposed to ozone under the conditions indicated in Example 1.

The results are reported in the following Table III:

TABLE III

| EXAMPLES/ TESTS | Product used | Time (in hours) to obtain an "average" state of cracking | |
| --- | --- | --- | --- |
| | | Static exposure | Dynamic exposure |
| 7 | ε-caprolactam | 8 | 49 |
| D | NONE | 2.7 | 1.5 |

EXAMPLE 8

In this example ε-caprolactam was tested as an antiozonant in the following base mixture:

| Material | Parts by weight |
| --- | --- |
| (1) Nitrile rubber | 100 (trademark Butacril BT 205) |
| (2) Carbon black N 330 | 50 |
| (3) Zinc oxide | 5 |
| (4) Stearic acid | 2 |
| (5) Butyl phthalate | 25 |
| (6) Sulfur | 2 |
| (7) 2-N—Cyclohexylbenzothiazolyl-sulfenamide (CBS) | 0.75 |
| (8) Tetramethylthiuram disulfide | 0.25 |
| (9) ε-Caprolactam | 2 |

The mixture, with the exception of the sulfur, the vulcanization accelerator and the protective system, was prepared in a Banbury type B internal mixer.

The missing ingredients were then added on roll mills as indicated in Example 1.

The mixtures were then vulcanized, in a press, at 153° C., in sheets 2 mm thick, to the vulcanization optimum. Specimens 2 mm in thickness were then exposed to ozone under the conditions of Example 1.

The time taken to obtain an average stage of craking was noted. The results are reported in Table IV which follows:

TABLE IV

| EXAMPLES/ TESTS | Product used | Time (in hours) to obtain an "average" state of cracking | |
| --- | --- | --- | --- |
| | | Static exposure | Dynamic exposure |
| 8 | ε-caprolactam | 6 | 14 |
| E | NONE | 4 | 3.6 |

EXAMPLE 9

This example illustrates the antiozonant action of ε-caprolactam in a blend of natural rubber and styrene-/butadiene rubber. The product was tested in the mixture consisting of the following ingredients:

| Material | Parts by weight |
| --- | --- |
| (1) Natural rubber | 50 |
| (2) Styrene/butadiene copolymer marketed under the trademark SBR 1500 | 50 |
| (3) Zinc oxide | 5 |
| (4) Stearic acid | 2 |
| (5) Carbon black N 330 | 50 |
| (6) Plasticizer | 8 |
| (7) Sulfur | 2.25 |
| (8) 2-N—Cyclohexylbenzothiazolyl-sulfenamide (CBS) | 0.75 |
| (9) ε-Caprolactam | 2 |

The mixture was prepared in a Banbury type B internal mixer. Only the vulcanizing system and the protective agent were added subsequently on roll mills as indicated in Example 1.

The mixtures were then vulcanized in molds, in a press at 153° C. in sheets 2 mm thick.

The mixtures were then exposed to ozone under the following conditions:
(a) controlled ozone concentration: 50 p.p.h.m.
(b) temperature 40° C.
(c) exposure of the speciments: dynamic, 25% extension at a rate of 30 cycles/minute.

The physical state of the specimens was monitored visually at regular intervals and the number of hours taken to obtain an average state of cracking was noted. The results are reported in the following Table V:

TABLE V

| EXAMPLES/ TESTS | Product tested | Time (in hours) to obtain "average" state of cracking (dynamic exposure) |
| --- | --- | --- |
| 9 | ε-caprolactam | 4 |
| F | NONE | 2.25 |

EXAMPLES 10 TO 14

These examples demonstrate that the lactam antiozonants are not also colorants. Same were tested in the following formulation:

| Material | Parts by weight |
| --- | --- |
| (1) Natural rubber (pale crepe) | 100 |
| (2) Zinc oxide | 5 |
| (3) Stearic acid | 1 |
| (4) Titanium dioxide | 20 |
| (5) Kaolin (Whitetex No. 2) | 15 |
| (6) Precipitated silica (trademark Zeosil 175 MP) | 15 |
| (7) Polyethylene glycol | 1 |
| (8) Tetramethylthiuram monosulfide | 0.5 |
| (9) Sulfur | 2.5 |
| (10) Lactams | 2 |

The mixture, with the exception of the vulcanizing system and the products of the invention, was prepared in a Banbury type B internal mixer.

The missing ingredients were then added on roll mills.

The mixtures were then vulcanized in a press, in sheets 2 mm thick, at 153° C., to the optimum.

Specimens of the mixture were then exposed to light in an accelerated aging test. The equipment empolyed provided a spectrum which was very rich in ultraviolet rays. The specimens were exposed for 100 hours.

The color of the specimens was noted.

The results in the Table VI which follows clearly demonstrate the insensitivity of the products of the invention to light:

TABLE VI

| EXAMPLES/ TESTS | Product tested | Color of the specimens | |
|---|---|---|---|
| | | Before aging | After 100 h of exposure |
| G | NONE | white | pale yellow |
| 10 | 2-pyrrolidionone- | white | pale yellow |
| 11 | caprolactam | white | pale yellow |
| 12 | 2-azacycloocta-none | white | pale yellow |
| 13 | 2-azacyclonanone | white | pale yellow |
| 14 | 2-azacyclotri-decanone | white | pale yellow |
| H | N—phenyl-N'—isopropyl-p-phenylenediamine | Light chestnut brown | dark chestnut brown |

EXAMPLE 15

100 parts by weight of 2-(2-methylcyclohexyl)-4,6-dimethylphenol (MDCP) were introduced into a round flask equipped with a stirrer. This was heated to a temperature of 55°–60° C. under slow stirring, then 100 parts by weight of caprolactam were gradually added and the stirring was continued up to a temperature of approximately 85° C.; this temperature was maintained for 15 minutes. A clear solution was obtained which was cooled to 20° C. This solution was employed to stabilize natural rubber.

The formula of the mixture was as follows:

| Material | Parts by weight |
|---|---|
| (1) Natural rubber SMR L | 100 g |
| (2) Zinc oxide | 5 g |
| (3) Stearic acid | 1 g |
| (4) Titanium dioxide | 20 g |
| (5) Kaolin (Whitetex No. 2) | 15 g |
| (6) Silica (Zeosil 175 MP) | 15 g |
| (7) Polyethylene glycol | 1 g |
| (8) 2-N—Cyclohexylbenzothiazylsulfenamide | 1 g |
| (9) Sulfur | 2 g |
| (10) Caprolactam solution | 3 g |

The mixture was prepared in a Banbury type B internal mixer. Only the vulcanizing system and the protective agent were added subsequently on roll mills as in Example 1.

The mixtures were then vulcanized in a press in molds at 153° C. as sheets 2 mm thick, to the optimum.

These mixtures were then exposed to ozone under the same conditions as in Example 1.

The results reported in Table VII were obtained:

TABLE VII

| PRODUCT USED | OPTIMUM TIME FOR VULCANIZATION AT 153° C., IN MINUTES | TIME, IN HOURS, TO OBTAIN AN AVERAGE STATE OF CRACKING. | |
|---|---|---|---|
| | | Static exposure | Dynamic exposure |
| Mixture of caprolactam and MDCP (50-50) | 10 | 54 | 74 |
| None | 15 | 7 | 3 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A composition of matter comprising (i) a natural or synthetic rubbery elastomer, said elastomer having incorporated therein (ii) 0.1 to 5% by weight of said rubbery elastomer (i) of a lactam antiozonant having the general formula:

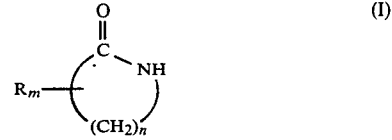

(I)

wherein n is an integer ranging from 3 to 20, m is 1 or 2, and R is lower alkyl or phenyl.

2. The composition of matter as defined by claim 1, said lactam (ii) comprising 2-pyrrolidinone, ε-caprolactam, ζ-oenantholactam(2-azacyclooctanone), caprylolactam(2-azacyclonanone) or laurolactam(2-azacyclotridecanone).

3. The composition of matter as defined by claim 1, said lactam being in solution in a liquid carrier material miscible with said rubbery elastomer (i).

4. The composition of matter as defined by claim 3, said liquid carrier material comprising a liquid phenolic anti-oxidant.

5. The composition of matter as defined by claim 4, said liquid phenolic antioxidant comprising a compound having the general formula:

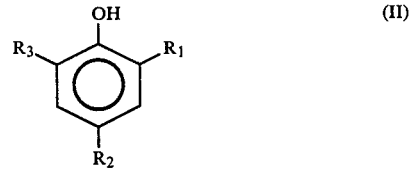

(II)

wherein $R_1$ is a mono- or polycyclic cycloalkyl radical, or a substituted such radical bearing at least one methyl substituent, and $R_2$ and $R_3$ are lower alkyl radicals.

6. The composition of matter as defined by claim 5, wherein $R_2$ and $R_3$ are methyl.

7. The composition of matter as defined by claim 4, wherein said liquid phenolic antioxidant comprises 2-(2-methylcyclohexyl)-4,6-dimethylphenol.

8. The composition of matter as defined by claim 4, said component (ii) comprising a solution of ε-caprolactam in 2-(2-methylcyclohexyl)-4,6-dimethylphenol.

9. An ozone-stabilizing composition of matter comprising (1) a solution of a lactam having the general formula:

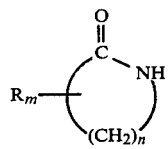

wherein n is an integer ranging from 3 to 20, m is 1 or 2, and R is lower alkyl or phenyl, in (2) a liquid phenolic antioxidant having the general formula:

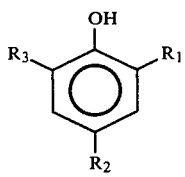

wherein $R_1$ is a mono- or polycyclic cycloalkyl radical, or a substituted such radical bearing at least one methyl substituent, and $R_2$ and $R_3$ are lower alkyl radicals.

10. The composition of matter as defined by claim 9, comprising a solution of ϵ-caprolactam in 2-(2-methyl-cryclohexyl)-4,6-dimethylphenol.

11. The composition of matter as defined by claim 1, in vulcanized state.

12. The composition of matter as defined by claim 5, in vulcanized state.

13. A shaped article comprising the composition of matter as defined by claim 11.

14. A masterbatch comprising the composition of matter as defined by claim 1.

15. A composition of matter comprising (i) a natural or synthetic rubbery elastomer, said elastomer having incorporated therein (ii) an antiozonant effective amount of an organic lactam compound.

* * * * *